United States Patent [19]

Masuyama et al.

[11] Patent Number: 5,390,754
[45] Date of Patent: Feb. 21, 1995

[54] BATTERY BOX FOR AN ELECTRIC VEHICLE

[75] Inventors: Toshio Masuyama; Masami Suzuki; Hiroyuki Fujimoto, all of Wako, Japan

[73] Assignee: Honda Giken Kogyo Kabushiki Kaisha, Tokyo, Japan

[21] Appl. No.: 3,582

[22] Filed: Jan. 13, 1993

[30] Foreign Application Priority Data

Jan. 16, 1992 [JP] Japan .................................. 4-005849
Jan. 16, 1992 [JP] Japan .................................. 4-005933

[51] Int. Cl.⁶ .................................................. B60K 1/04
[52] U.S. Cl. ........................................ 180/68.5; 105/51; 429/100
[58] Field of Search ............... 180/68.5, 65.1, 60; 105/51; 429/100, 99, 96, 98

[56] References Cited

U.S. PATENT DOCUMENTS

| | | | |
|---|---|---|---|
| 1,138,122 | 5/1915 | Lambert et al. | 180/68.5 |
| 1,338,690 | 5/1920 | Moorman | 180/68.5 |
| 1,359,446 | 11/1920 | Stephens et al. | 180/68.5 X |
| 1,384,063 | 7/1921 | Hatfield | 180/68.5 |
| 2,104,769 | 1/1938 | Saunders | 180/68.5 |
| 2,488,360 | 11/1949 | Williams | 180/68.5 |
| 4,135,593 | 1/1979 | Fowkes | 180/68.5 X |
| 4,216,839 | 8/1980 | Gould et al. | 180/68.5 X |
| 4,317,497 | 3/1982 | Alt et al. | 180/68.5 |
| 4,365,681 | 12/1982 | Singh | 180/68.5 |

FOREIGN PATENT DOCUMENTS

5127047 11/1972 Japan .
1555773 11/1979 United Kingdom .

Primary Examiner—Joseph Pape
Attorney, Agent, or Firm—Lyon & Lyon

[57] ABSTRACT

A battery box, which is suitable for use in an electric vehicle, comprises a box body and a reinforcement member. The box body accommodates therein a plurality of batteries for powering the electric vehicle and is mounted to the electric vehicle. The reinforcement member is provided with the box body and supports at least respective portions of all the batteries in the box body. The reinforcement member is mounted to the frame of the electric vehicle whereby the weight of each of the batteries is reliably supported by the reinforcement member on the vehicle frame. The weight is reduced and yet the rigidity of the battery box is improved.

26 Claims, 10 Drawing Sheets

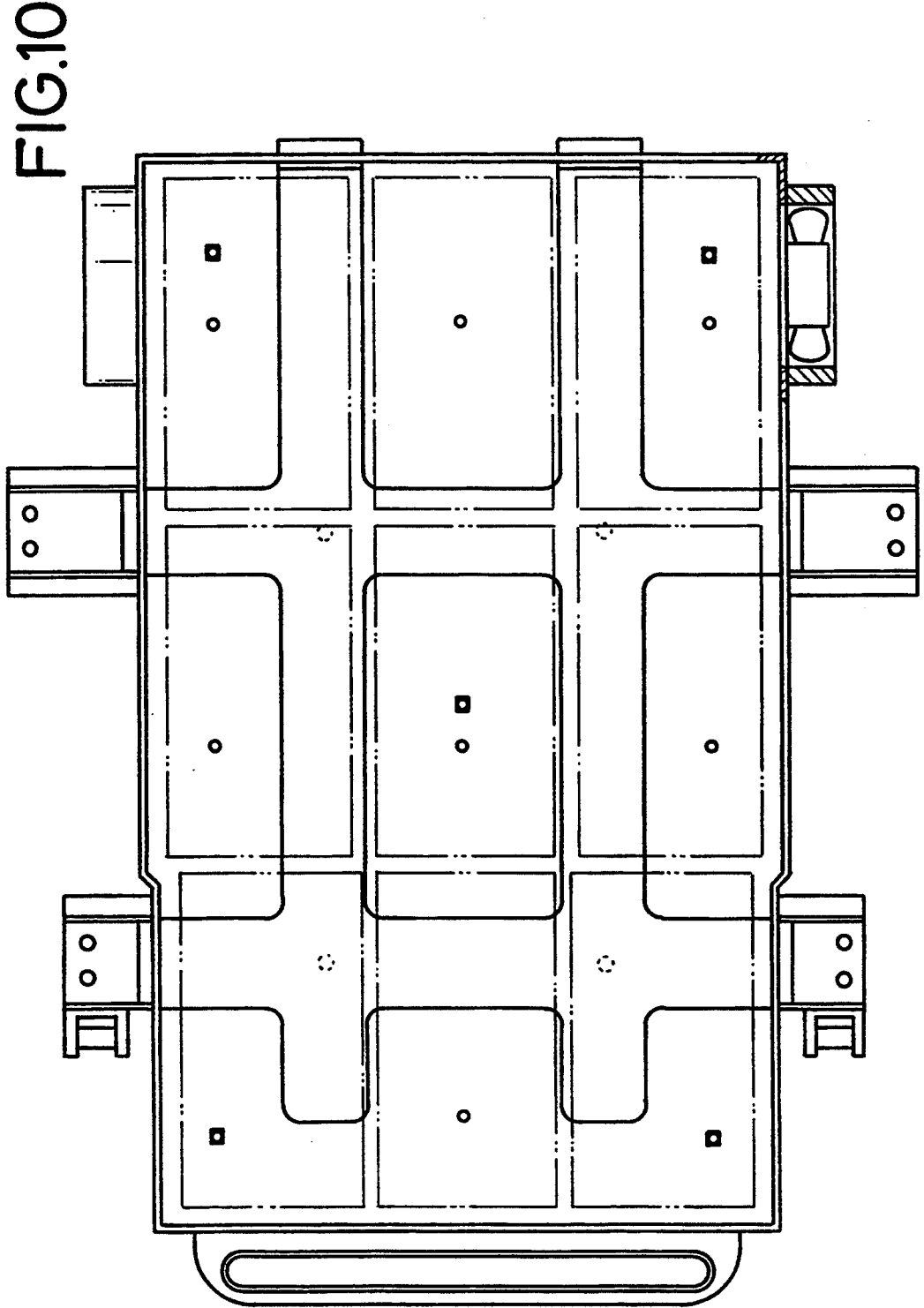

BATTERY BOX FOR AN ELECTRIC VEHICLE

BACKGROUND OF THE INVENTION

1. Field of the Invention

The present invention relates to a battery box for accommodating therein a plurality of batteries for driving an electric vehicle.

2. Description of the Related Art

As a power supply for driving an electric vehicle there has normally been used a power supply of the type wherein a plurality of batteries are electrically series-connected to one bother. When a battery of 12 V is used, for example, it is necessary to electrically series-connect nine or more batteries to one another to produce desired electric power and to mount the connected batteries to the electric vehicle. Therefore, a space for accommodating the batteries therein greatly increases.

Each of the batteries is heavy in weight. Therefore, a proposal for disposing such heavy batteries under the floor so as to lower the center of gravity of the electric vehicle has been made (see Japanese Patent Application Publication No. 51-27047, GB 1555773 A, etc.).

When, however, all the batteries are placed under the floor, crossmembers cannot be mounted between the sideframes of the vehicle body insufficiently close spacing because of the amount the space required for positioning the large number of batteries between the sideframes. It is therefore difficult to effectively maintain the rigidity of the frame of the vehicle body.

When, on the other hand, the batteries are suspended under the floor to avoid interference with the crossmembers in a state in which the batteries have been accommodated in a battery box, nine or more batteries are so heavy in weight that it becomes necessary to greatly increase the strength of the battery box for holding the batteries therein. It is therefore considered necessary to increase the thickness of the materials forming the battery box to ensure its strength. However, this creates the problem that the battery box becomes heavy in weight, thereby increasing the entire weight of the vehicle body and reducing the rigidity of the vehicle body.

It is also considered necessary to affix the battery box to a frame member by tightening members such as bolts, etc. from below the frame member in order to use the battery box as a portion of the rigid body of the vehicle. However, all the bolts, which are the tightening members, are positioned and tightened so as to extend in the vertical direction. Therefore, when an impact or the like is applied to the vehicle body so as to exert a horizontal external force on the battery box, the external force is directly exerted on the bolts as a shearing force which may result in shearing of the bolts and detachment of the battery box from the vehicle.

SUMMARY OF THE INVENTION

With the foregoing problems in view, it is therefore an object of the present invention to provide a battery box which can be reduced in weight and effectively improved in rigidity.

In order to achieve the above object, there is provided a battery box suitable for use in an electric vehicle, comprising a box body for mounting on the electric vehicle and for accommodating therein a plurality of batteries for driving the electric vehicle, and a reinforcement member provided on the box body for holding respective portions of all the batteries in the box body.

It is preferable that the reinforcement member of the battery box comprises an inner plate which extends within the box body and outer plates each of which extends outwardly from the box body and is shaped in cross section so as to correspond to the inner plate.

It is preferable that the inner plate and the outer plates of the battery box respectively extend in both the longitudinal direction and the transverse direction of the electric vehicle.

It is preferable that the reinforcement member of the battery box includes mounting portions for holding the box body firmly to a frame member of the electric vehicle.

It is preferable that the box body has a plurality of drain holes defined therein for discharging water to the outside.

It is preferable that the reinforcement member of the battery box has a plurality of drain holes defined therein for discharging the water to the outside.

It is preferable that the batteries are disposed in an inner member and the box body has mounting portions for fixing the inner member, which are defined therein so as to correspond to regions at which the reinforcement member is not provided.

It is preferable that the battery box further includes fixing means for fixing the box body to the frame member of the electric vehicle in a suspended state, with each of the fixing means having first tightening members positioned and tightened in the vertical direction and a second tightening member positioned and tightened in the horizontal direction.

It is preferable that such first tightening members are provided in forward and backward positions as seen in the direction in which the electric vehicle travels and the second tightening member is provided at least in a forward position as seen in the vehicle traveling direction.

It is preferable that each of such fixing means has a holding member spaced a predetermined interval from each of the first tightening members so as to be opposed to the ends of the first tightening members.

It is preferable that such holding member is externally fitted on the second tightening member and the second tightening member is disposed so as to extend in the longitudinal direction of the electric vehicle. As an alternative construction, it is preferable that the second tightening member is disposed so as to extend in the transverse direction of the electric vehicle.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 10 is a plan view showing the battery box shown in each of FIGS. 8 and 9 with portions cut-away.

DETAILED DESCRIPTION OF THE PREFERRED EMBODIMENTS

A battery box suitable for use in an electric vehicle, according to the present invention will herein-after be described with reference to the accompanying drawings in which preferred embodiments are shown by way of illustrative example.

Figure 1:
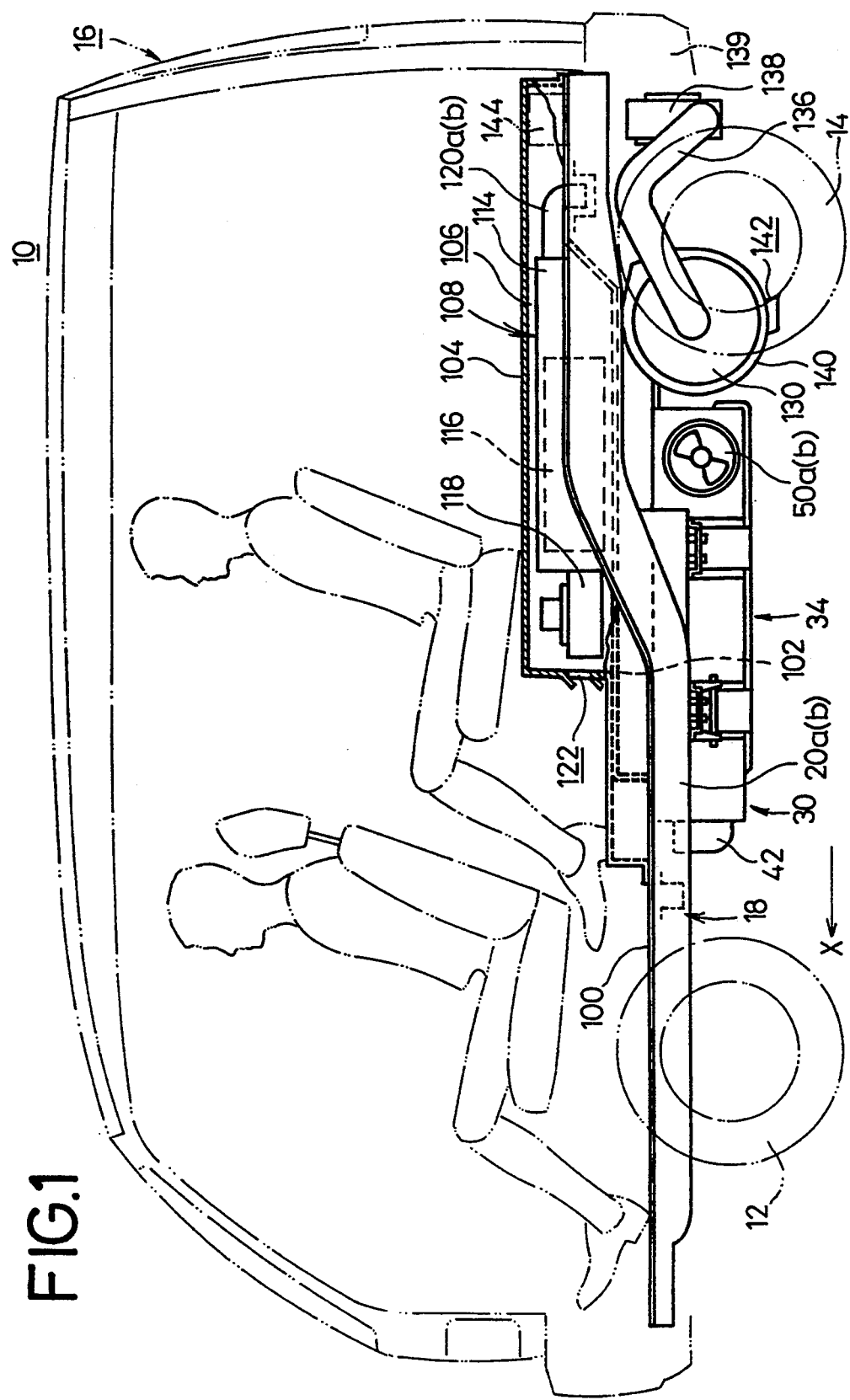
FIG. 1 is a schematic side view showing an electric vehicle having a battery box according to a first embodiment of the present invention incorporated therein.
Figure 2:
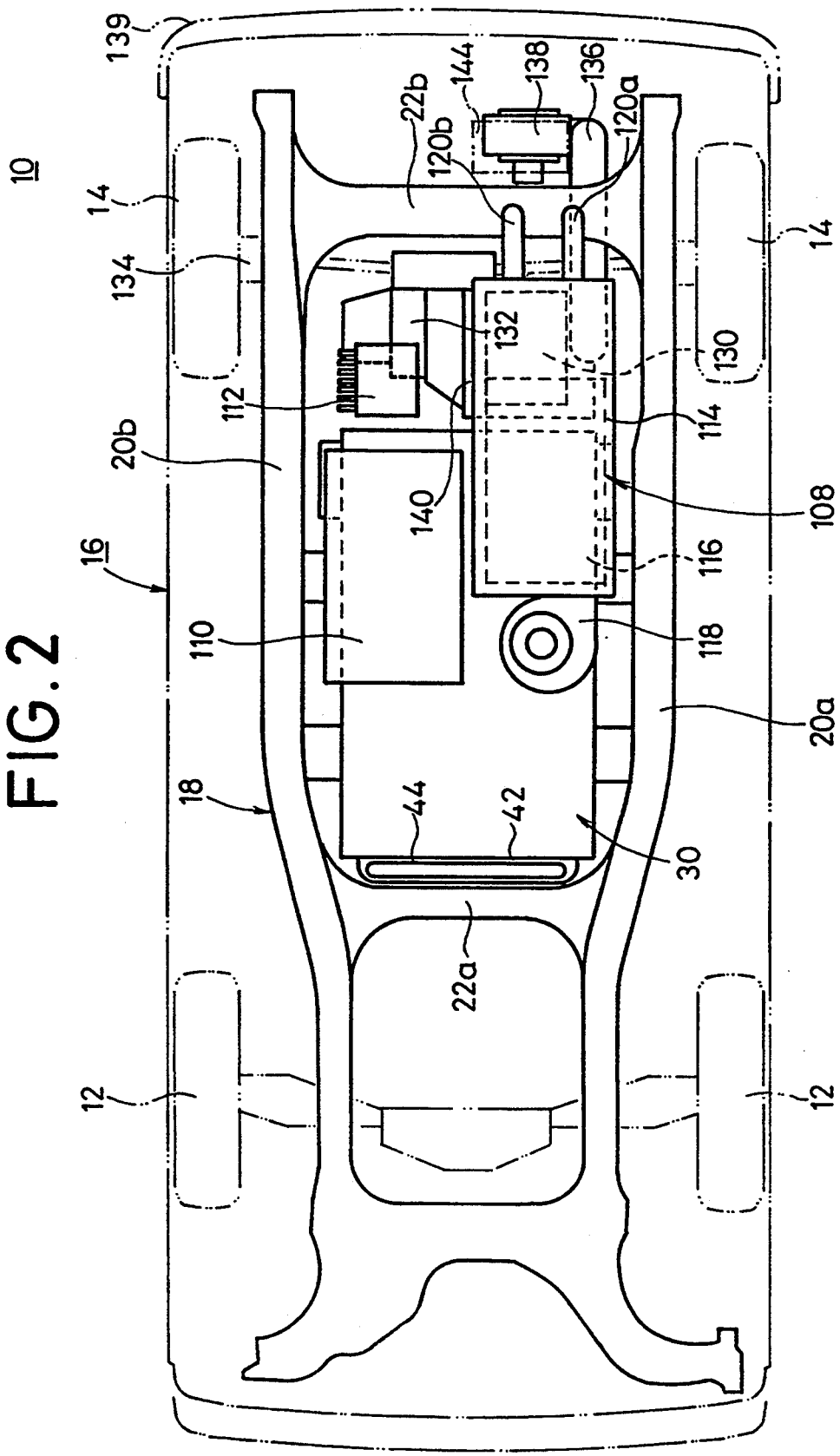
FIG. 2 is a schematic plan view showing the electric vehicle.

In FIGS. 1 and 2, reference numeral 10 indicates an electric vehicle to which a battery box according to a first embodiment is applied. The electric vehicle 10 comprises front wheels 12, rear wheels 14 and a vehicle body 16. A frame member 18 of the vehicle body 16 has a hollow or open area surrounded by a front-side crossmember 22a and a rear-side crossmember 22b between sideframes 20a and 20b (see FIG. 2).

The battery box 30 according to the present embodiment, which is provided between the front wheels 12 and the rear wheels 14, is held by the sideframes 20a, 20b in a suspended state (see FIGS. 3 through 7). The battery box 30 includes a box body 34 which accommodates nine batteries 32a through 32i in a pattern of three rows of three batteries in each row for driving the electric vehicle 10 and is mounted to the electric vehicle 10. A reinforcement member 36 is attached to the box body 34 and is used to support or hold at least respective portions of all the batteries 32a through 32i in the box body 34. A fixing means 37 is employed on each lateral side of the battery box 30, according to the first embodiment, each of which is used to hold the box body 34 firmly to the frame member 18 in a suspended state. The batteries 32a through 32i respectively each comprise ten cells electrically series-connected to one another so as to provide a voltage of 12 V each and a total output voltage of 108 V (see FIGS. 6 and 7).

Figure 6:
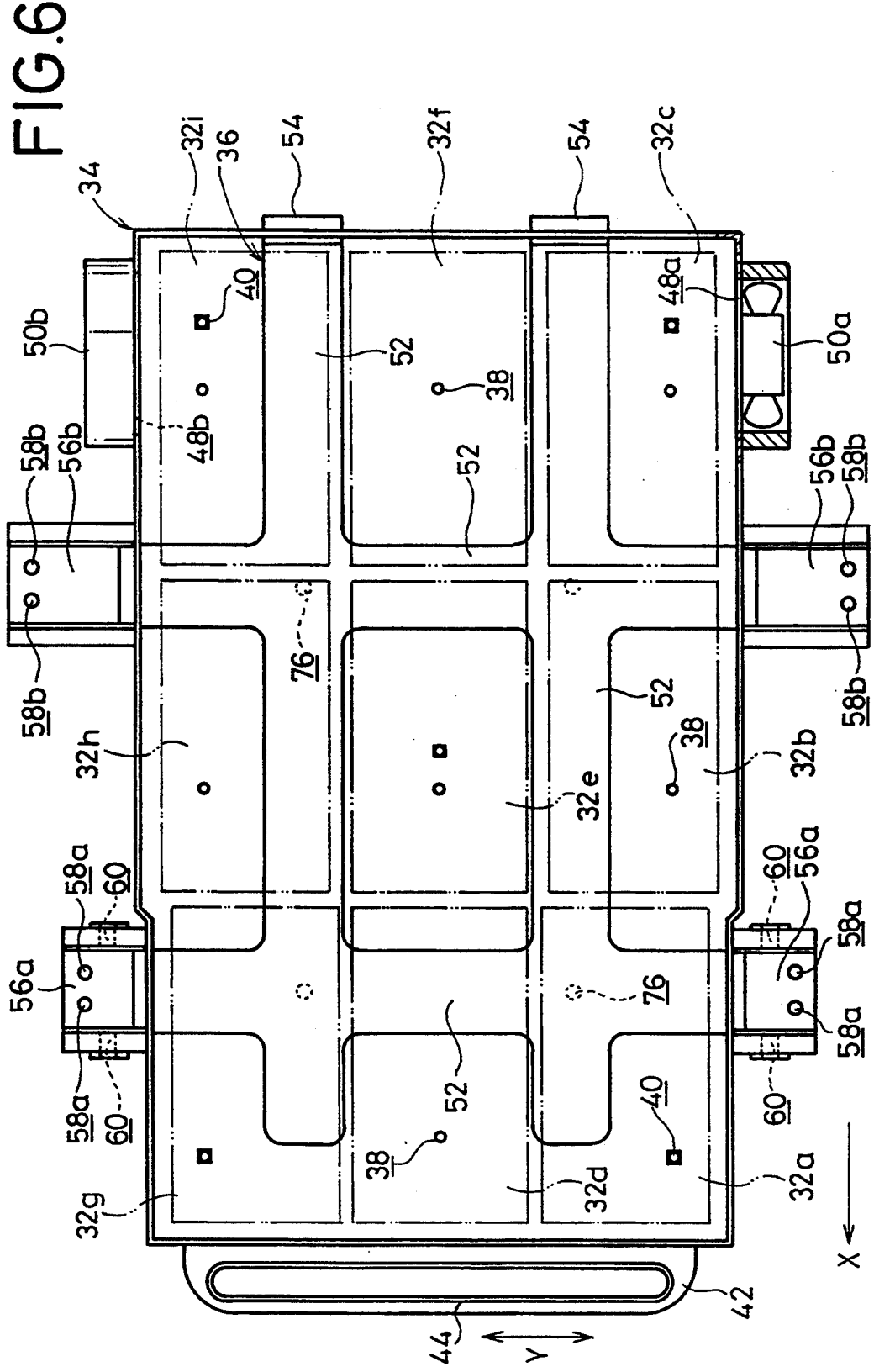
FIG. 6 is a plan view illustrating the body of the battery box with portions cut-away.

As shown in FIG. 6, a plurality of drain holes (seven holes in the present embodiment) 38 for discharging water or moisture in the box body 34 to the outside are defined in bottom of the box body 34. Further, a plurality of mounting holes (four holes in the present embodiment) 40 for fixing an inner spacer (to be described later) provided therein with the batteries 32a through 32i, are defined in the box body 34 so as to correspond to regions at which the reinforcement member 36 is not provided.

Figure 7:
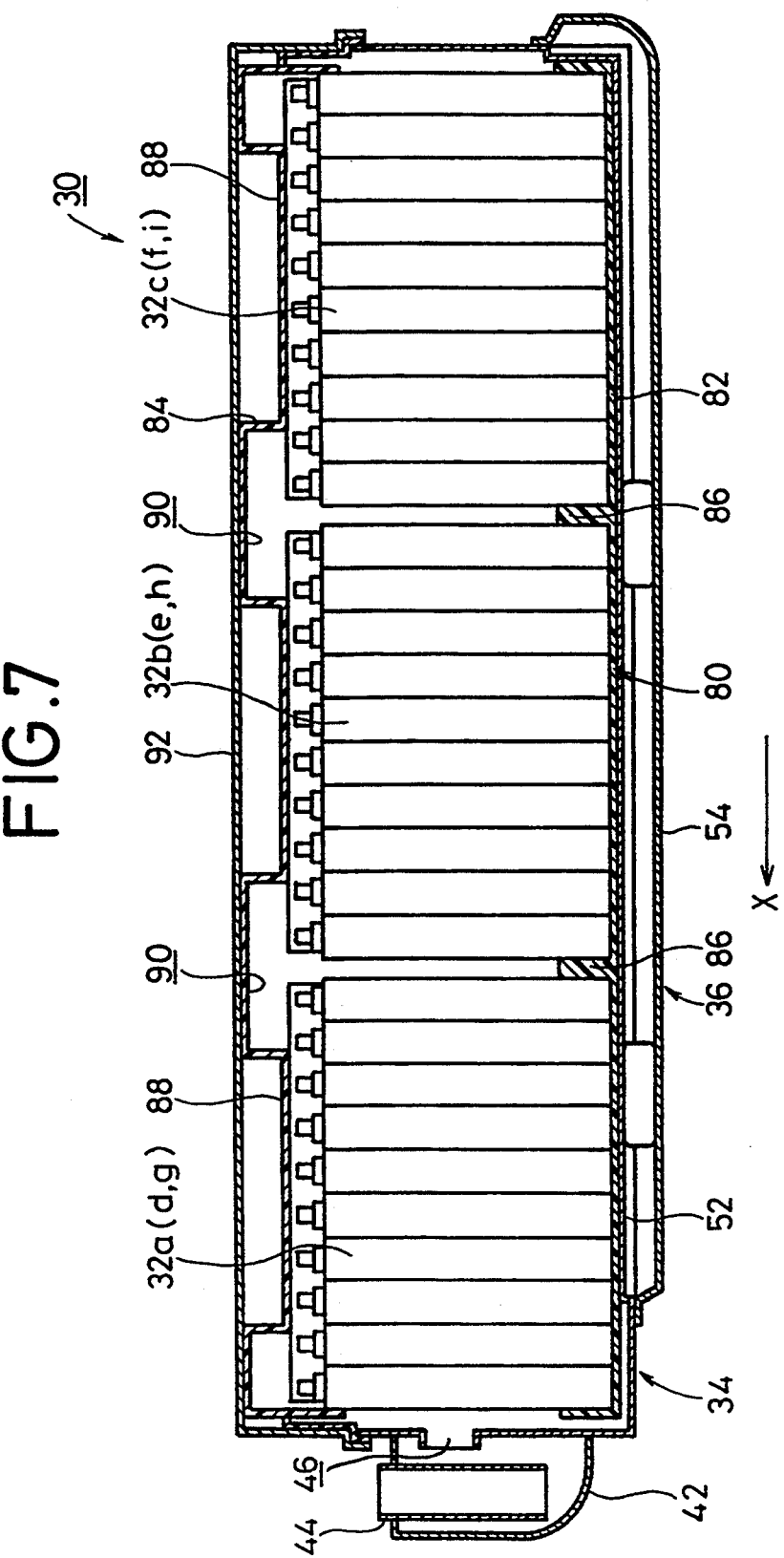
FIG. 7 is a vertical cross-sectional side view illustrating the battery box.

Referring next to FIGS. 6 and 7, a casing 42, which extends in the vehicle width or transverse direction (i.e., in the direction indicated by the arrow Y), is fixed to a front end of the box body 34, which box body 34 extends in a direction (i.e., in the direction indicated by the arrow X) in which a vehicle body travels. Further, an elongated tubular body 44, which extends in the vehicle transverse direction, is mounted to an upper portion of the casing 42. One end of the tubular body 44 extends upwardly of the casing 42 so as to be opened to the outside, whereas the other end thereof is opened in the vicinity of an inner lower end of the casing 42. An opening or aperture 46, which extends along the vehicle transverse direction and causes the upper portion of the casing 42 to communicate with the inside of the box body 34, is defined in the front end of the box body 34. Holes 48a, 48b are defined in rear ends of opposite side walls of the box body 34. Cooling fans 50a, 50b are mounted in the holes 48a, 48b respectively.

Figure 3:
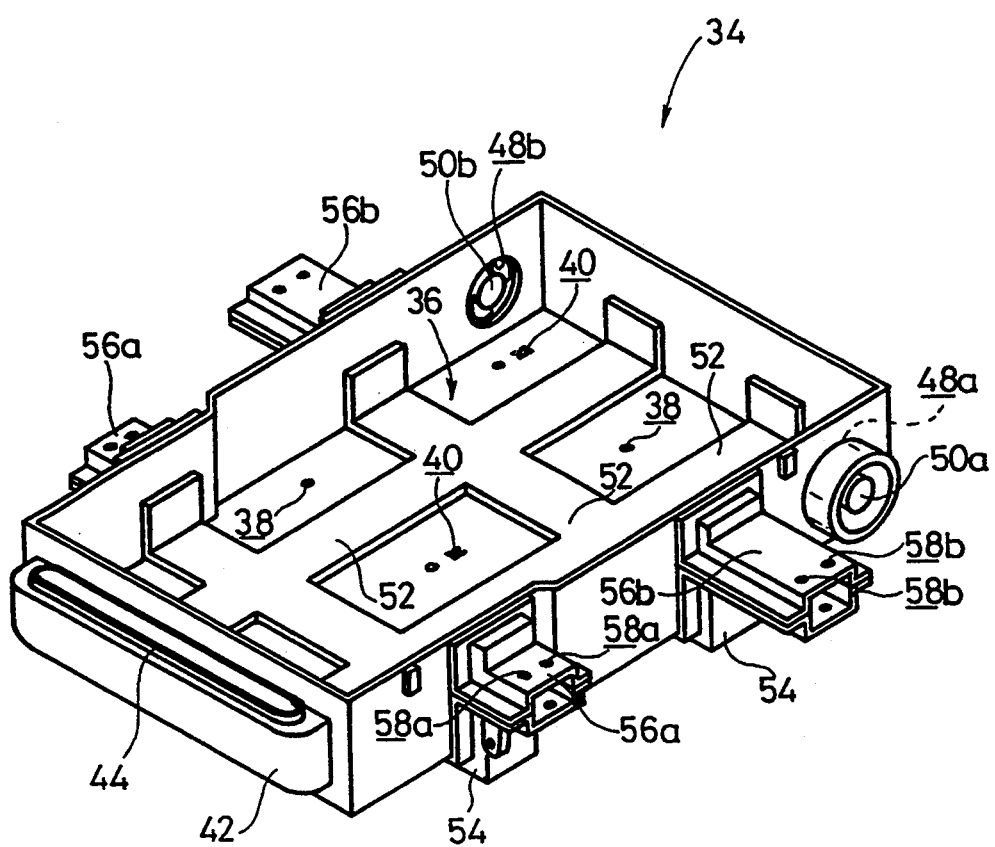
FIG. 3 is a perspective view showing the battery box.

As shown in FIGS. 3 and 6, the reinforcement member 36 comprises an inner plate 52 formed by deforming the inner walls of the box body 34 toward the inside of the box body 34, and separately formed outwardly-bent outer plates 54 fixedly mounted to the corresponding outer walls of the box body 34 by welding and each shaped in cross section so as to correspond to the inner plate 52. The inner plate 52 and the outer plates 54 extend both in the longitudinal direction of the vehicle and in the vehicle transverse direction so is to correspond to the positions where the batteries 32a through 32i are located. The outer plates 54 respectively include a pair of opposite frontal mounting portions 56a and a pair of opposite rear mounting portions 56b for mounting the box body 34 onto the frame member 18, which are provided on their corresponding portions extending in the vehicle transverse direction and vertically extending from both outer walls of the box body 34.

Figure 4:
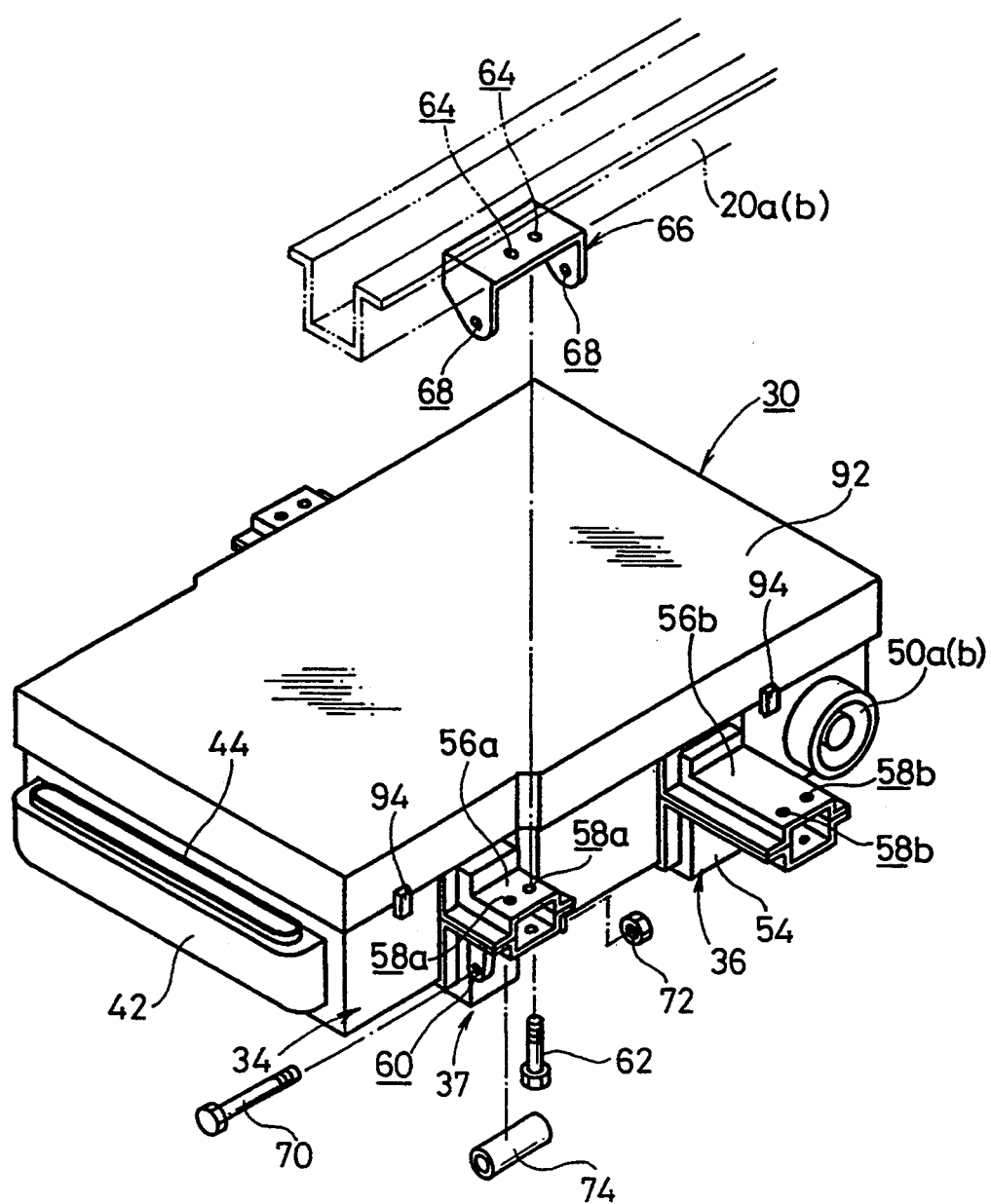
FIG. 4 is a perspective view for describing the manner of mounting of the battery box.
Figure 5:
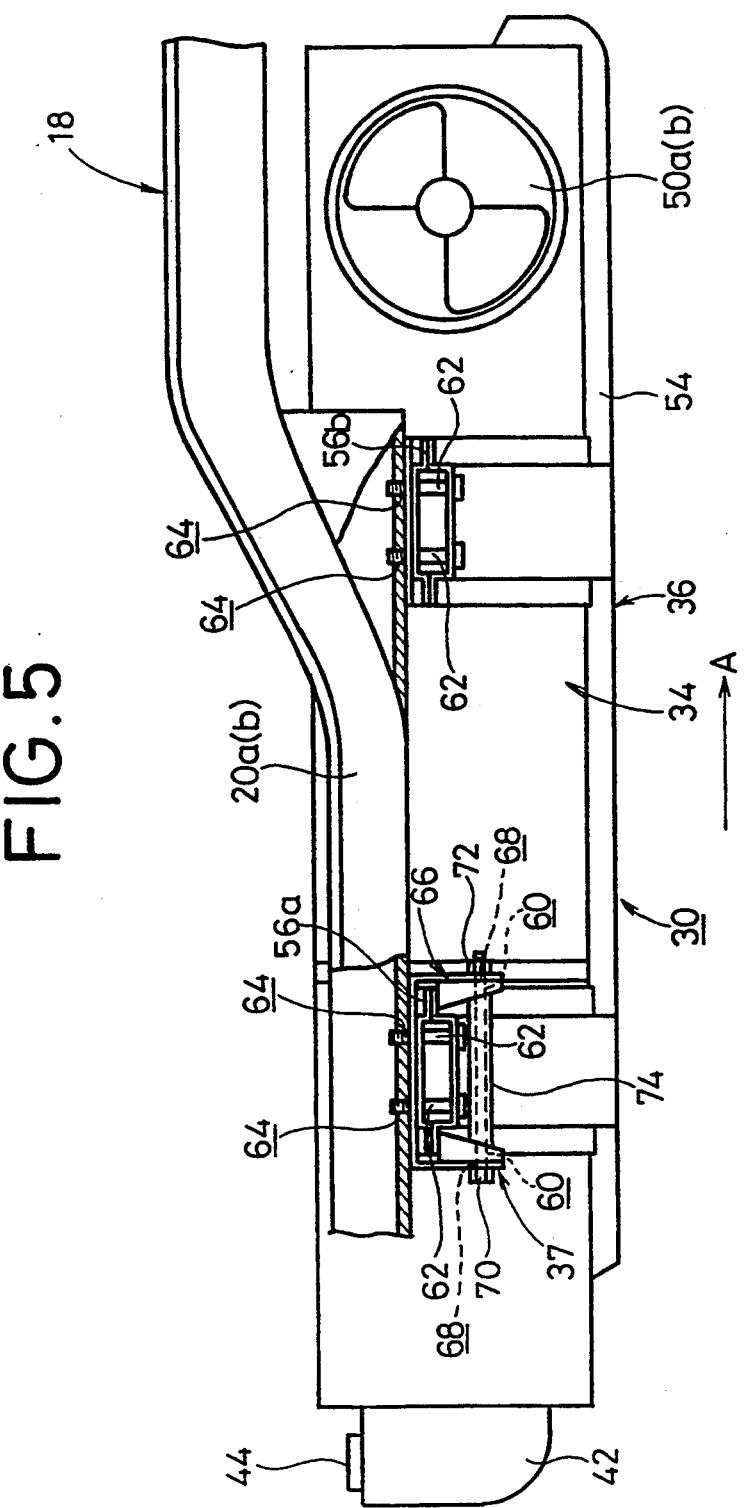
FIG. 5 is a side view of a portion of the vehicle with portions shown in cross-section for describing the manner of mounting of the battery box.

As shown in FIGS. 4 and 5, the fixing means 37 is mounted to each of the frontal mounting portions 56a and the rear mounting portions 56b. Each fixing means 37 comprises first bolts 62 comprising first fastening or tightening members positioned and tightened vertically and a second bolt 70 comprising a second fastening tightening member positioned and tightened horizontally and in the longitudinal direction of the vehicle. The first bolts 62 are inserted through their corresponding bolt insertion holes 58a, 58a defined in each of the frontal mounting portions 56a and extend therethrough in the vertical direction for threadedly engaging the corresponding internally-threaded bores 64 defined in each of the sideframes 20a, 20b. Further, the first bolts 62 are inserted through their corresponding bolt insertion holes 58b, 58b defined in each of the rear mounting portions 56b and extend therethrough in the vertical direction for threadedly engaging the corresponding internally-threaded bores 64 defined in each of the sideframes 20a, 20b.

The second bolt 70 is first inserted through one of two corresponding bolt insertion holes 60, 60 which are disposed below the bolt insertion holes 58a, 58a and defined in the frontal mounting portions 56a and which coaxially extend in the longitudinal direction of the vehicle, then inserted into the corresponding holes 68, 68 defined in a bracket 66 fixed to each of the sideframes 20a, 20bb, and then through the second insertion hole 60. A nut 72 is threadedly engaged with the end of the second bolt 70. Further, a collar 74 comprising a holding member is externally fitted on each second bolt 70 between holes 68 on bracket 66. The outer peripheral surface of the collar 74 is spaced a predetermined small interval away from the head of each first bolt 62 in opposing relationship (see FIG. 5).

A plurality of drain holes (four holes in the present embodiment) 76 for discharging water or moisture introduced between the outer plates 54 and the inner plate 52 to the outside are defined in the outer plates 54 (see FIG. 6).

The batteries 32a through 32i are accommodated in the battery box 30 in a state in which they are spaced away from each other and separated from the inner wall surfaces of the battery box 30 by an inner spacer assembly 80 (see FIG. 7). The inner spacer assembly 80 comprises a lower inner spacer 82 and an upper inner spacer 84, each of which is composed of a synthetic resin, for example, polypropylene (PP). The lower inner spacer 82 includes partition members 86 divided into nine compartments to dispose the nine respective batteries 32a through 32i separately from each other. The upper inner spacer 84 has pressing members 88 for pressing and holding desired portions of the batteries 32a through 32i and concave portions 90 for defining spaces used for conductive wires and cooling.

The batteries 32a through 32i are held in the box body 34 in a confined state in which the lower and upper surfaces of the batteries 32a through 32i are held by the lower inner spacer 82 and the upper inner spacer 84, respectively. A cover 92 mounted on the upper inner spacer 84 side is fixed integrally with the box body 34 by lock members 94. At this time, the cover 92 and the box body 34 are sealed by interposing the ends and concave portions 90 of the upper inner spacer 84 between the cover 92 and the box body 34. The lower inner spacer 82 is fixed to the box body 34 by threadedly inserting unillustrated bolts into corresponding mounting holes 40 defined in the box body 34.

A vehicle floor 100 is formed above the battery box 30. Further, a lower floor 102 and an upper floor 104 are provided in the vehicle to the rear of the floor 100. A chamber 106 is defined between the lower floor 102 and the upper floor 104. The chamber 106 accommodates therein a motor controller 108, a distribution box 110 and a voltage transformer 112 for changing or reducing high voltages supplied from the batteries 32a through 32i to predetermined low voltages (see FIGS. 1 and 2).

The motor controller 108 has a power drive unit 116 accommodated within a box 114. An air feed port for a cooling fan 118 is fixedly provided on the leading end of the box 114 and exhaust ducts 120a, 120b are provided on the rear end of the box 114. The exhaust ducts 120a, 120b are left open within the crossmember 22b. An opening or aperture 122, which is opened into or communicates with the interior of the vehicle body 16, is defined in the leading end of the upper floor 104. Air in the vehicle interior is introduced into the box 114 via the aperture 122 under the action of the fan 118.

A drive motor 130 is provided at the rear end of the vehicle body 16. The motor 130 is coupled via a transmission 132 to a rear-wheel drive shaft 134. A cooling fan 138 is coupled to the motor 130 by a duct 136 and an intake port of the fan 138 is opened toward the reverse side of a bumper 139 of the vehicle body 16. The duct 136 is bent upwardly between the fan 138 and the motor 130. The duct 136 is used to directly supply cooling air to a rotatable shaft of the motor 130. The cooling air passes through the inside of a cover 140 of the motor 130 and is discharged to the outside from a discharge port 142.

An auxiliary battery 144 is mounted at the rear end of the vehicle body 16 and used to energize lighting equipment, for example.

The operation of the electric vehicle 10 constructed as described above will now be described in connection with the battery box 30 according to the present embodiment.

First, the motor controller 108 is activated to drive the motor 130 in accordance with electric power supplied from the batteries 32a through 32i. Thus, the rear-wheel drive shaft 134 coupled to the transmission 132 is rotated so as to rotate the roar wheels 14, thereby driving the electric vehicle 10. At this time, the batteries 32a through 32i are electrically series-connected to each other and actually output a high voltage of 108 V. Therefore, the high voltage thus outputted is reduced to a given voltage by the voltage transformer 112 and the reduced voltage is supplied to the motor 130.

In the present embodiment, the battery box 30 for accommodating the batteries 32a through 32i therein includes the box body 34 and the reinforcement member 36. Further, the reinforcement member 36 extends in both the vehicle longitudinal and transverse directions so as to correspond to the positions where each of the batteries 32a through 32i is disposed. At least a respective portion of all the batteries 32a through 32i are supported on the reinforcement member 36 (see FIG. 6). The reinforcement member 36 can effectively support the load of each of the batteries 32a through 32i. It is therefore possible to improve the entire rigidity of the battery box 30 and to reliably support or hold the batteries 32a through 32i which are very heavy in weight.

Further, since at least respective portions of all the batteries 32a through 32i can be held by the reinforcement member 36, the box body 34 can be easily reduced in thickness, thereby making it possible to lighten the entire weight of the battery box 30.

Moreover, the frontal mounting portions 56a and the rear mounting portions 56b are connected directly to the reinforcement member 36. Furthermore, the frontal mounting portions 56a and the rear mounting portions 56b are fixed firmly to the corresponding sideframes 20a and 20b by the first and second bolts 62, 70. Accordingly, the reinforcement member 36 itself can serve as a vehicle frame crossmember, so that the entire rigidity of the vehicle body 16 can be increased. Thus, although it is difficult to use a conventional crossmember in view of the space required for positioning each of the batteries 32a through 32i and the like, the reinforcement 36 of the battery box 30 can functionally perform in a manner similar to the crossmember, thereby making it possible to prevent the rigidity of the vehicle body 16 from being reduced.

The drain holes 38 are defined in the box body 34 and the drain holes 76 are defined in the outer plates 54 of the reinforcement member 36. Thus, even if the water or moisture enters into the battery box 30, the water is reliably discharged to the outside. In particular, connecting portions between the respective adjacent batteries 32a through 32i can be reliably prevented from rusting.

The box body 34 has the mounting holes 40 for fixing the lower inner spacer 82 of the inner spacer assembly 80 to the body box 34, which holes are defined therein so as to correspond to the regions at which the reinforcement member 36 is not provided. Therefore, the reinforcement member 36 is not reduced in strength.

Further, each fixing means 37 employed in the first embodiment includes the second bolt 70 which extends in the horizontal direction (i.e., in the longitudinal direction of the vehicle). Therefore, when an impact or the like is applied to the vehicle body 16 to thereby exert an external force on the battery box 30 in the horizontal longitudinal direction (i.e., in the direction indicated by the arrow A as shown in FIG. 5), the external force can be reliably supported by the second bolt 70. It is thus possible to effectively prevent a large shearing force from being applied to each first bolt 62.

Furthermore, each of the collars 74 is externally mounted on the second bolt 70 and the outer peripheral surface of each collar 74 is spaced a predetermined interval from the head of each first bolt 62 in opposing relationship thereto. Therefore, even if the first bolts 62 become loosened, the head of each of the first bolts 62 comes into contact with the outer peripheral surface of the collar 74. It is thus possible to reliably prevent each first bolt 62 from becoming disconnected and falling.

In the present embodiment as well, each of the second bolts 70 is attached to the frontal mounting portion 56a alone, which is placed in a forward position in the direction in which the vehicle body 16 moves. However, similar second bolts 70 also may be attached to the rear mounting portions 56b as well. Incidentally, a larger load acts on the battery box 30 upon controlled stopping of the vehicle than upon its acceleration. It is therefore desired that tile second bolts 70 are attached to at least the frontal mounting portions 56a to support the large load applied to the front of the battery box 30.

Figure 8:
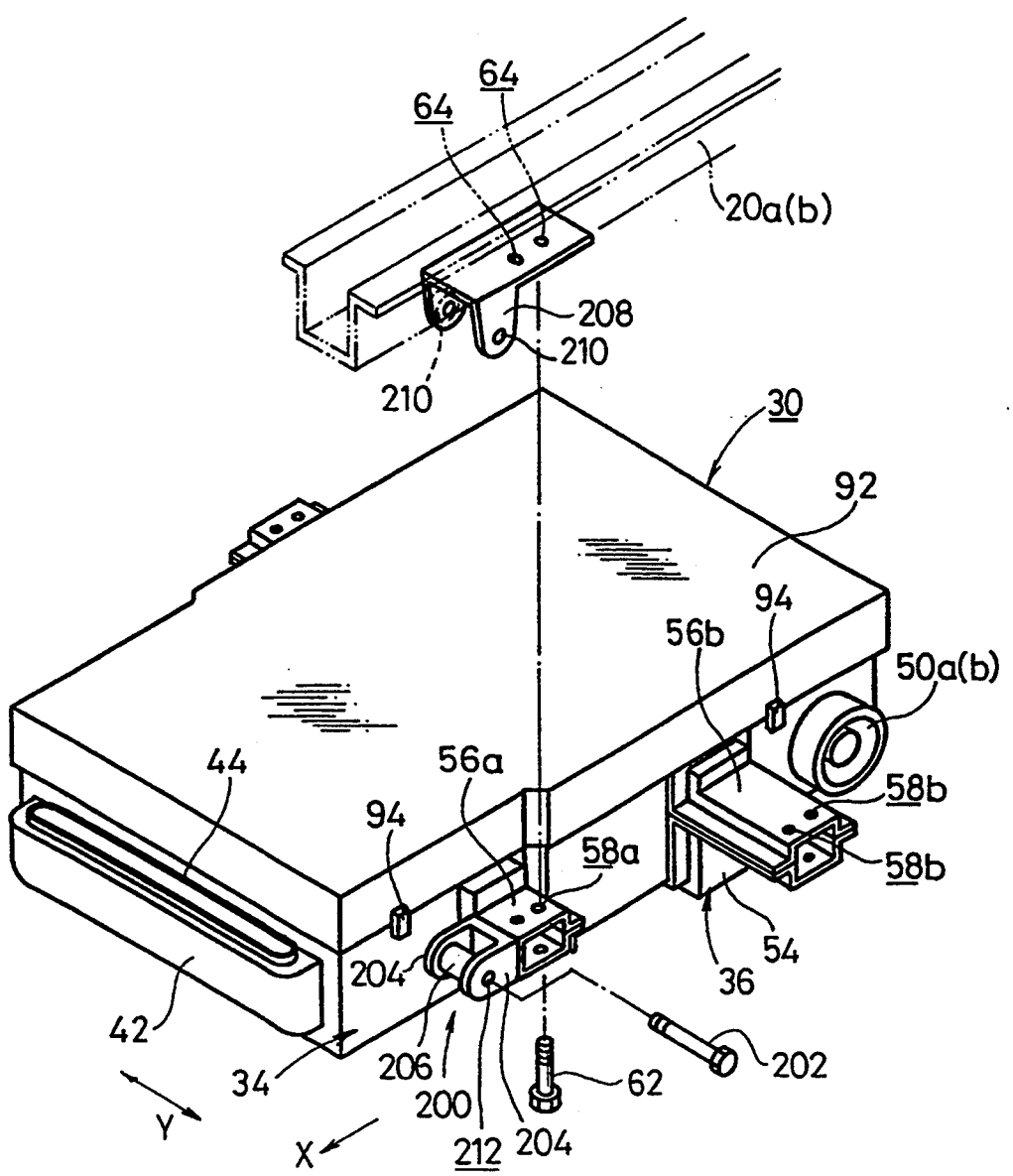
FIG. 8 is a perspective view showing a battery box according to a second embodiment of the present invention having fixing means incorporated therein.
Figure 9:
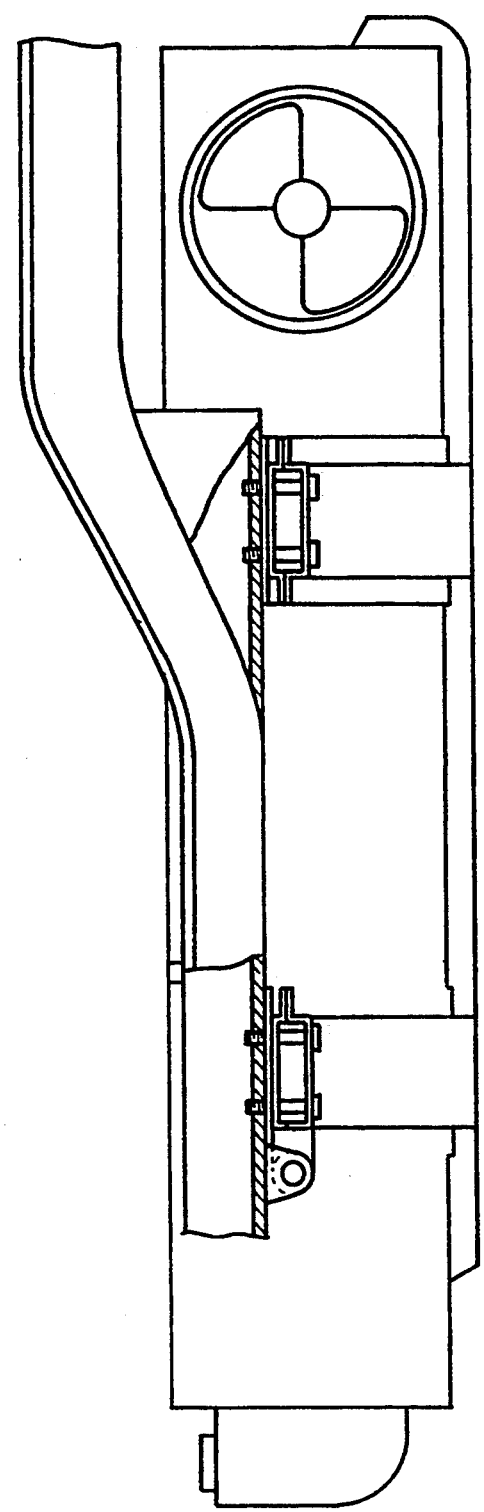
FIG. 9 is a side view of a portion of the vehicle with portions shown in cross-section for describing the manner of mounting of the battery box shown in FIG. 8.

Fixing means 200 employed in a battery box according to a second embodiment will now be described with reference to FIGS. 8 through 10. Incidentally, the same reference numerals in FIGS. 8 through 10 as those shown in FIGS. 4 through 6 indicate the same elements of structure as those in the first embodiment, and their detailed description will therefore be omitted.

Each of the fixing means 200 has first bolts 62 and a second bolt 202 positioned and tightened in the transverse horizontal direction (i.e., in the vehicle transverse direction). Flanges 204, 204, which extend forward in the direction in which the vehicle body runs (i.e., in the direction indicated by the arrow X), are mounted to a frontal mounting portion 56a, and a cylindrical body 206 is disposed between the flanges 204 and 204. Brackets 208 are fixed to each of sideframes 20a, 20b so that the flanges 204, 204 are inserted or fitted therein. The second bolt 202 is inserted through holes 210, 210 defined in the bracket 208 and a hole 212 defined integrally in the flanges 204, 204 and cylindrical body 206. A nut 214 is threaded onto the end of each second bolt 202.

Each of the fixing means 200 employed in the second embodiment, which has been constructed as described above, includes the second bolt 202 which extends in the transverse horizontal direction (i.e., in the vehicle transverse direction). Thus, even if an external force horizontally acts on the battery box 30, it can be reliably supported by the second bolt 202 in a manner similar to the second bolt 70 of each of the fixing means 37 employed in the first embodiment. Therefore, a large shearing force can be prevented from being exerted on each of the first bolts 62.

According to a battery box of the present invention, which is suitable for use in an electric vehicle, a reinforcement member is provided with the box body and at least respective portions of all the batteries are supported by the reinforcement member. Thus, even when a plurality of batteries are used, the weight of each of the batteries can be reliably supported by the reinforcement member. Therefore, the box body can be easily reduced in weight and the entire rigidity of the battery box can be effectively improved.

In the battery box of the present invention, as well, each of the fixing means for holding the box body firmly to a frame member of the electric vehicle in a suspended state includes first tightening members positioned and tightened in the vertical direction and a second tightening member positioned and tightened in the horizontal direction. When an impact or the like is applied to a vehicle body, the second tightening member extending in the horizontal direction can reliably bear that impact. It is therefore possible to reliably prevent a large shearing force from acting on each of the vertically-extending first tightening members.

Having now fully described the invention, it will be apparent to those skilled in the art that many changes and modifications can be made without departing from the spirit or scope of the invention as set forth herein.

We claim:

1. A battery box, for use in an electric vehicle, comprising:
    a box body for mounting on said electric vehicle for accommodating therein a plurality of batteries for powering said electric vehicle; and
    a reinforcement member provided with said box body for supporting at least respective portions of all the batteries in said box body, wherein said reinforcement member comprises an inner plate means which extends within said box body and outer plate means which extend outwardly from said box body and is shaped in cross section so as to correspond to said inner plate.

2. A battery box according to claim 1, wherein said inner plate means and said outer plate means both extend in both the longitudinal direction of said electric vehicle and the transverse direction of said electric vehicle.

3. A battery box according to claim 1, wherein said reinforcement member includes mounting portions for mounting said box body to a frame member of said electric vehicle.

4. A battery box according to claim 1, wherein said box body has a plurality of drain holes defined therein for discharging water to the outside.

5. A battery box according to claim 1, wherein said reinforcement member has a plurality of drain holes defined therein for discharging the water to the outside.

6. A battery box according to claim 1, wherein said batteries are disposed in an inner spacer means and said box body has mounting portions for fixing said inner spacer means, which mounting portions are defined in the body box at regions spaced from said reinforcement member.

7. A battery box for use in an electric vehicle, comprising:
    a box body for mounting on said electric vehicle for accommodating therein a plurality of batteries for powering said electric vehicle;
    a reinforcement member provided with said box body for supporting at least respective portions of all the batteries in said box body; and
    fixing means for fixing said box body to a frame member of said electric vehicle in a suspended state, each of said fixing means having a first tightening member positioned and tightened in the vertical direction and a second tightening member positioned and tightened in the horizontal direction.

8. A battery box according to claim 7, wherein a pair of said first tightening members are provided in each fixing means in forward and rearward positions in the direction in which said electric vehicle travels and said second tightening member is provided in a forward position in the vehicle running direction.

9. A battery box according to claim 7, wherein each of said fixing means has a holding member spaced a predetermined interval from each of said first tightening members so as to be opposed to the ends of said first tightening members.

10. A battery box according to claim 9, wherein said holding member is externally fitted on said second tightening member and said second tightening member is disposed so as to extend in the longitudinal direction of said electric vehicle.

11. A battery box according to claim 8, wherein said second tightening member is disposed so as to extend in the transverse direction of said electric vehicle.

12. A battery box for use in an electric vehicle, comprising
a box body for accommodating a plurality of batteries for powering said electric vehicle;
a reinforcement member provided with said box body, said reinforcement member including means for connecting directly to a frame of said electric vehicle for supporting said body box from said frame; and
wherein said reinforcement member comprises an inner plate means formed integrally with and extending inwardly within said box body and outer plate means attached to and extending outwardly from said box body, said outer plate means being shaped to correspond to and be superimposed on said inner plate.

13. A battery box according to claim 12, wherein said inner plate means and said outer plate means both extend in both the longitudinal direction and the transverse direction of said electric vehicle.

14. A battery box according to claim 12 or 13 wherein said reinforcement member includes portions for supporting each of the batteries in said box body.

15. A battery box according to claim 12, wherein said box body has a plurality of drain holes defined therein at locations spaced from said reinforcement member for discharging water to the outside.

16. A battery box for use in an electric vehicle, comprising
a box body for accommodating a plurality of batteries for powering said electric vehicle;
a reinforcement member provided with said box body, said reinforcement member including means for connecting directly to a frame of said electric vehicle for supporting said body box from said frame; and
wherein said reinforcement member is hollow and has a plurality of drain holes defined therein for discharging the water to the outside.

17. A battery box for use in an electric vehicle, comprising
a box body for accommodating a plurality of batteries for powering said electric vehicle;
a reinforcement member provided with said box body, said reinforcement member including means for connecting directly to a frame of said electric vehicle for supporting said body box from said frame; and
wherein said batteries are disposed in an inner spacer means for spacing said batteries from each other and top, bottom, side and end walls of said box body, said inner spacer means being supported on said reinforcement member.

18. A battery box for use in an electric vehicle, comprising
a box body for accommodating a plurality of batteries for powering said electric vehicle;
a reinforcement member provided with said box body, said reinforcement member including means for connecting directly to a frame of said electric vehicle for supporting said body box from said frame; and
further including fixing means for fixing said reinforcement member to said frame of said electric vehicle in a suspended state, each of said fixing means having a first tightening member positioned and tightened in the vertical direction and a second tightening member positioned and tightened in the horizontal direction.

19. A battery box according to claim 18, wherein each of said fixing means has a holding member spaced a predetermined interval from each of said first tightening members so as to be opposed to the ends of and prevent dislodgement of said first tightening members.

20. A battery box according to claim 18, wherein said second tightening member is disposed so as to extend in the longitudinal direction of said electric vehicle.

21. A battery box according to claim 18, wherein said second tightening member is disposed so as to extend in the transverse direction of said electric vehicle.

22. A battery box for use in an electric vehicle, comprising:
a box body for accommodating a plurality of batteries;
a reinforcement member provided with said box body; and
fixing means for fixing said box body and reinforcement member to a frame member of said electric vehicle in a suspended state, each said fixing means having a first tightening member positioned and tightened in the vertical direction and a second tightening member positioned and tightened in the horizontal direction.

23. A battery box according to claim 22, wherein a pair of said first tightening members are provided with each fixing means in forward and rearward positions in the direction in which said electric vehicle travels and said second tightening member is provided in a forward position in the vehicle running direction.

24. A battery box according to claim 22, wherein each of said fixing means has a holding member spaced a predetermined interval from each of said first tightening members so as to be opposed to the ends of said first tightening members.

25. A battery box according to claim 24, wherein said holding member is externally fitted on said second tightening member and said second tightening member is disposed so as to extend in the longitudinal direction of said electric vehicle.

26. A battery box according to claim 23, wherein said second tightening member is disposed so as to extend in the transverse direction of said electric vehicle.

* * * * *